April 3, 1956  R. W. DOCHTERMAN  2,740,908
SUBMERSIBLE DYNAMOELECTRIC MACHINE
Filed July 6, 1953
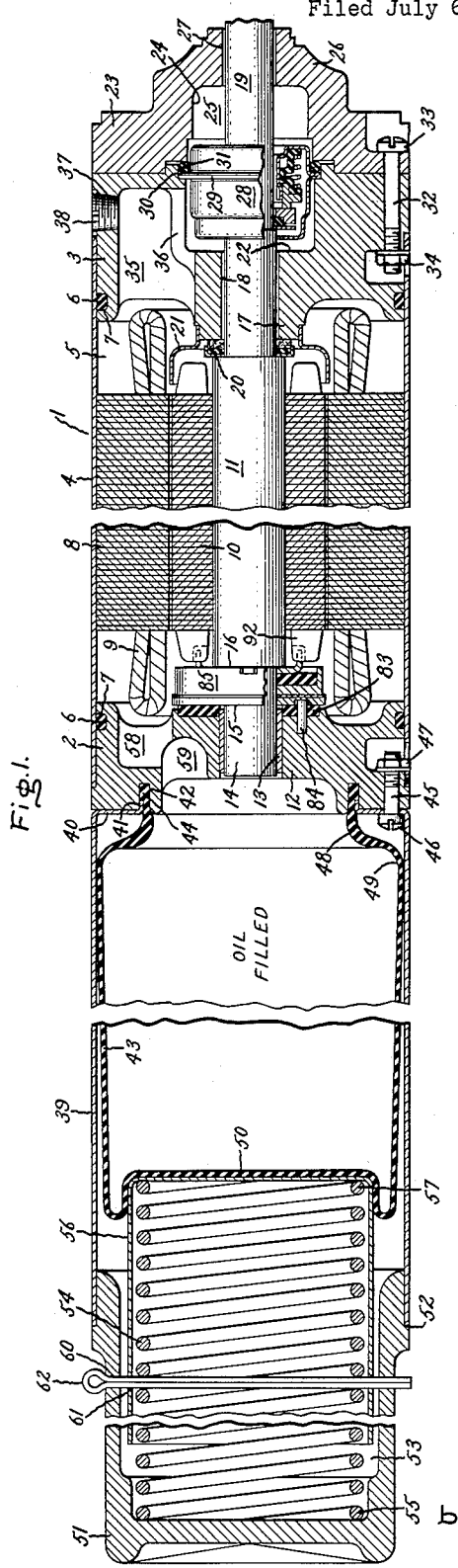
Inventor:
Richard W. Dochterman,
by Robert G. [signature]
His Attorney.

United States Patent Office 2,740,908
Patented Apr. 3, 1956

2,740,908

SUBMERSIBLE DYNAMOELECTRIC MACHINE

Richard W. Dochterman, Fort Wayne, Ind., assignor to General Electric Company, a corporation of New York Application July 6, 1953, Serial No. 366,209

7 Claims. (Cl. 310—87)

This invention relates to dynamoelectric machines and more particularly to machines adapted to be operated while submersed in a liquid, for example submersible pump motors.

In certain pumping applications, it is desirable to position the pump impeller and its driving motor adjacent to the bottom of the well casing. In this type of installation, the motor is generally arranged below the pump and is thus surrounded with the liquid in the well, usually water. It is necessary in the design of motors for this type of application to provide a sealing arrangement for preventing the liquid in the well from entering the motor. Complicated shaft seals have been utilized in the past however even the best of these devices are subject to wear and ultimately allow the liquid to enter the interior of the machine. In other designs, some of the liquid under pressure from the outlet of the pump has been utilized in a seal to prevent entrance of the liquid from the well. Arrangements of this type however have been characterized by their complexity and expensive construction.

It is therefore desirable to provide a submersible dynamoelectric machine construction having means providing a positive seal against the entrance of liquid from the well with the sealing arrangement being simple, inexpensive, and readily assembled.

It is therefore an object of this invention to provide an improved submersible dynamoelectric machine construction incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a dynamoelectric machine is provided having a casing defining a cavity in which the stator and the rotor are arranged. One end of the shaft extends out of the cavity and a seal is provided mounted on the casing and surrounding the shaft to prevent the entrance of liquid into the cavity. A collapsible bag is provided having its open end attached to the other end of the casing and communicating with the cavity, and the bag and the cavity are filled with a suitable fluid, such as oil. Resilient means, such as a coil spring, are arranged to exert pressure on the bottom of the bag, tending to turn it inside out, thus placing the fluid in the interior of the machine under continuous pressure. The outer surface of the bag is accessible to the liquid in the well, so that the well liquid pressure is exerted on the fluid in the interior of the machine. Because of this, the fluid in the machine will always be subjected to the well liquid pressure plus the spring pressure. The spring pressure, then, will always provide a positive differential pressure between the machine fluid and the well liquid. Due to this differential pressure, any leakage due to a defective seal, will be outward, rather than inward, thus preventing the liquid in the well from entering the interior of the machine.

In the drawing, Fig. 1 is a side elevational view, partly in section, illustrating the improved submersible dynamoelectric machine construction of this invention;

Fig. 2 is a fragmentary view, partly in section, illustrating the shaft seal of the construction of Fig. 1 in greater detail; and Fig. 3 is an exploded view illustrating the thrust bearing of the construction of Fig. 1 in greater detail.

Referring now to Fig. 1, there is shown a submersible dynamoelectric machine, such as a submersible pump motor, generally identified as 1, it being understood that the motor 1 will ordinarily be vertically arranged in a well casing rather than horizontally arranged as shown in the drawing.

The motor 1 is provided with a first end flange 2 and a second end flange 3 spaced therefrom. An outer cylindrical shell member 4 surrounds the outer peripheries of end flanges members 2 and 3 defining a stator and rotor cavity 5 therewith. Annular seals 6 formed from suitable resilient material, such as rubber or neoprene, are arranged in suitable annular grooves 7 in the outer peripheries of end flange members 2 and 3 respectively. Seals 6 serve to prevent the entrance of liquid from the well into the cavity 5 of the machine past the shell 4 and end flange members 2 and 3.

A stator member 8, formed with a plurality of laminations of relatively thin magnetic material, is mounted within shell 4 in cavity 5 and has suitable field windings 9 arranged in winding slots therein (not shown). Rotor 10, shown here as being of the squirrel cage induction type, is positioned within the bore of stator 8 and is mounted on shaft 11.

End flange member 2 has a central hub portion 12 with a sleeve bearing 13 mounted therein in which end 14 of shaft 11 is rotatably positioned. A thrust bearing assembly 15 is secured to the inner face of hub 12 of end flange 2, and a thrust collar assembly 16 is mounted on shaft 11 cooperating with thrust bearing 15, as will be hereinafter more fully described.

End flange 3 is provided with an inwardly extending hub 17 with an aperture 18 formed therein through which extension 19 of shaft 11 extends. A thrust washer assembly 20 is mounted on shaft extension 19 between a shoulder of shaft 11 and the end of hub 17 of end flange 3. Angular baffle 21 is mounted on the outer periphery of hub portion 17 of end flange 3 and surrounds thrust assembly 20. An annular recess 22 is formed in the outer face of end flange 3 and another end flange 23 is provided and arranged abutting the outer face of end flange 3 and having a similar annular recess 24 defining a seal cavity 25 with recess 22 in end flange member 3. End flange member 23 is also provided with a hub portion 26 having an aperture 27 formed therein through which shaft extension 19 extends.

A seal assembly 28 is mounted in seal cavity 25 surrounding shaft 19. The seal 28, which will be hereafter more fully described, has an outer annular flange 29 positioned in a groove 30 formed in end flange member 3 and is held in assembled position by a resilient annular ring 31 and the clamping action of end flange member 23. End flange member 23 is secured to end flange member 3 by means of suitable bolts 32 with their heads 33 being arranged in suitable recesses on the exterior of end flange 23 and their nuts 34 being arranged in suitable recesses on the outer peripheral surface of end flange member 3. Hub portion 17 of end flange member 3 is connected to the outer peripheral portion thereof by means of a plurality of radially extending ribs 35 thereby defining passages 36 so that the stator and rotor cavity 5 communicates with the seal cavity 25. A suitable opening 37 is formed in the outer peripheral surface of end flange 3 in which a plug 38 is positioned to provide for filling the interior of the machine with a suitable fluid, such as oil, as will be hereinafter more fully described.

In order to prevent the entrance of the liquid in the well into the stator and rotor cavity 5 of the motor 1 along the shaft extension 19, the arrangement now to be described is provided. Another cylindrical shell member 39 is provided having an inwardly extending annular flange portion 40 abutting the outer surface of end flange member 2 and with an axially extending annular flange portion 41 extending into an annular groove 42 formed in the outer face of end face member 2. A collapsible bag 43, preferably formed of suitable resilient material, such as rubber or neoprene, is positioned within shell member 39 with its annular edge 44 at its open end being clamped in the annular groove 42 of the end flange member 2 by flange 41 of shell 39. Shell 39 is secured to end flange member 2 by means of suitable bolts 45 with their heads 46 engaging annular flange 40 within shell 39 and their nuts 47 arranged in suitable recesses in the outer peripheral surface of end flange member 2. It will be readily apparent that securing shell 39 to the end flange member 2 by means of bolts 45 secures the bag 43 in position at the same time.

Bag 43, has a neck portion 48 extending inwardly from its opening and an enlarged portion 49 in engagement with the inner surface of shell 39. The outer peripheral surface of bag 43 then tapers slightly inwardly toward the left, as viewed in Fig. 1, to its bottom portion 50.

Shell member 39 is provided with a cover portion 51 and has a rabbet connection therewith, as at 52. The cover member 51 has a cavity 53 formed therein in which a suitable coil spring 54 is arranged with its end 55 in engagement with the bottom of cover member 51. A cup-shaped spring retainer member 56 is arranged over the end 57 of spring 54 and engages the outer surface of bottom 50 of the collapsible bag 43. It will be readily seen in Fig. 1 that spring 54 and cup-shaped member 56 constitute biasing means engaging the bottom 50 of bag 43. The bag 43 extends laterally beyond the biasing means so that the biasing means tend to turn the bag inside out.

Hub portion 12 of end flange member 2 is connected to the outer peripheral portion thereof by means of a plurality of suitable ribs 58 thereby providing passages 59 communicating between the interior of the bag 43 and the stator and rotor cavity 5.

In order to prevent the liquid in the well from leaking along shaft extension 19 and through the seal assembly 28, the bag 43, stator and rotor cavity 5, and that portion of seal cavity 25 on the side of seal assembly 28 adjacent the stator and rotor cavity 5, is filled with a suitable fluid, such as oil. It will be readily seen that spring 54 exerts pressure on the bottom 50 of bag 43 tending to collapse the bag, as shown in Fig. 1, thus placing the oil in the interior of the bag and the interior of the motor under continuous pressure which is exerted on the seal 28.

In order to initially fill the bag 43 and stator and rotor cavity 5 of the motor 1 with oil, suitable openings 60 and 61 are respectively formed in the walls of cover member 51 and spring retainer 56. A cotter pin 62 may then be inserted in openings 60 and 61 and between the turns of spring 54 to hold the spring in compressed position so that it does not expand collapsing bag 43 to force the oil out of the machine. The oil is introduced to the interior of the machine through the opening 37 in end flange member 3.

To assemble the machine of Fig. 1, the bag 43 and shell 39 are attached to end flange 2 and the machine filled with oil. The spring 54 is then compressed in the cover 51, until the holes 60 and 61 are aligned and the pin 62 is then inserted to restrain the spring. The spring retainer 56 is then assembled over the end 57 of spring 54 and the cover 51 attached to the shell 39. At the time the complete device is installed, the pin 62 is removed thus permitting the released spring 54 to apply pressure on the bag 43. When pin 62 is removed, openings 60 and 61 provide access to the outer surface of bag 43 for the liquid in the well, so that the pressure on the bag will be that of the well liquid plus that of spring 54. As the oil inside of the motor leaks across the seal assembly 28, the spring pressure on the bag 43 causes it to collapse in a uniform manner taking up the reduction in oil volume resulting from the loss through the seal. The bag 43 will continue to collapse as the total oil volume is reduced as long as the spring applies pressure on the bag. Thus, the oil in the interior of the motor 1 will tend to leak outwardly along shaft 19 through the seal 28 rather than the liquid on the exterior of the motor 1 tending to leak in the reverse direction through the seal assembly into the interior of the machine. This is effected because the pressure of the oil in the motor 1 will always be greater than that of the well liquid by the amount of spring pressure. Any leakage of the oil through the seal 28 to the interior of the machine is compensated by spring 54 progressively collapsing bag 43 to maintain constant oil pressure.

Referring now to Fig. 2, the seal assembly 28 is formed from a first cup-shaped member 63 having an outer annular flange 64 bent over engaging an annular flange 65 of a second annular cup-shaped member 66 to form flange 29. Cup-shaped member 63 has an aperture 67 through which shaft extension 19 extends while cup-shaped member 66 has a reentrant flange 68 surrounding shaft extension 19. Shaft extension 19 has a shoulder 69 formed thereon within cup-shaped member 63 with an annular metal washer 70 in allotment therewith. An annular ring 71 of suitable resilient material is also mounted on shaft extension 19 and abuts washer 70. A cup-shaped running washer 72 is arranged around resilient washer 71 and is spaced from shaft extension 19. A sealing washer 73 is then arranged abutting cup-shaped running washer 72 within the cavity 74 defined by reentrant flange 68 of cup-shaped member 66. An annular resilient bellows 75 is provided having a substantially U-shaped cross section arranged within reentrant flange 68 and having one end engaging the outer wall of cup-shaped member 66 and its other leg engaging sealing washer 73. A suitable spring 76 is arranged within the U-shaped bellows 75 and engages the two legs thereof. It will now be seen that the U-shaped bellows 75, spring 76, pressure sealing member 73 are stationary and the cup-shaped running member 72, metal washer 70 and resilient washer 71 rotate with the shaft 19 thus providing the sealing action.

Referring now to Fig. 3, the thrust bearing assembly 15 includes an annular plate 77 having an aperture 78 formed therein through which shaft extension 14 extends. The back side 79 of plate 77 is preferably formed of steel while the front side 80 is preferably covered with Babbitt material. A plurality of shallow radially extending slots 81 are formed in the Babbitt material 80 and a plurality of shallow pockets 82 are also formed in the Babbitt material 80 communicating with the slots 81. The steel side 79 of plate 77 engages an annular resilient washer 83 which in turn abuts the face of hub portion 12 of end flange member 2. Plate member 77 is held restrained from rotation by means of suitable pins 84, on one end of which is seated in an opening in the end of hub 12 and other end of which is seated in an opening in steel surface 79 of plate 77.

The thrust bearing assembly 16 includes a cup-shaped member 85 having an aperture 86 formed therein through which shaft extension 14 extends and having a pair of axially extending slots 87 formed in its peripheral edge. A washer 88 of suitable resilient material is arranged within the cup-shaped washer 85 and a driving member 89 completes the assembly, being also arranged within cup-shaped member 85 and abutting resilient washer 88. Driving member 89 has a pair of ears 90 formed thereon respectively arranged in the slots 87 of cup-shaped member 85 and a pair of dogs 91 which engage suitable slots in end ring 92 of rotor 10. It is thus seen that driving member 89, by means of its connection with end ring 92 of rotor 10, drives cup-shaped member 85 which bears against plate member 77 thus forming the thrust bearing.

It will now be seen that this invention provides an improved submersible dynamoelectric machine construction wherein a positive seal against the entrance of liquid is provided, the construction being characterized by its simplicity and ease of assembly.

While I have shown and described a specific embodiment of this invention, further modifications and improvements will occur to those skilled in the art. I desire that it be understood, therefore, that this invention is not limited to the form shown and I intend in the appended claims to cover all modifications which do not depart from the spirit and scope of this invention.

What I claim as new and desire to secure by Letters Patent of the United States is:

1. A submersible dynamoelectric machine comprising an outer casing defining a stator and rotor cavity, a stator member mounted in said casing within said cavity, a cooperating rotor member in said cavity and mounted on a shaft, sealing means mounted in said casing and surrounding said shaft at one end of said cavity for preventing the entrance of an external liquid to said cavity, another casing secured to said outer casing, a collapsible bag positioned in said other casing and having its open end secured to said outer casing and communicating with said cavity, said cavity and said bag being adapted to be filled with a fluid, and biasing means in said other casing engaging the bottom of said bag, said bag extending laterally beyond said biasing means whereby said biasing means tend to turn said bag inside out thereby placing said fluid under continuous pressure and tending to cause the same to leak outwardly through said sealing means.

2. A submersible dynamoelectric machine comprising a pair of spaced apart end flange members, an outer shell member mounted on said end flange members and defining a stator and rotor cavity therewith, a stator member mounted in said shell member within said cavity, a cooperating rotor member in said cavity and mounted on a shaft, one of said end flange members having an opening formed therein with said shaft extending therethrough, sealing means mounted on said one end flange member adjacent said opening and surrounding said shaft for preventing the entrance of an external liquid to said cavity, a collapsible bag having its open end secured to the other of said end flange members, said other end flange member having an opening formed therein communicating with the interior of said bag and said cavity, said cavity and said bag being adapted to be filled with a fluid, and biasing means engaging the bottom of said bag, said bag extending laterally beyond said biasing means whereby said biasing means tend to turn said bag inside out thereby placing said fluid under continuous pressure and tending to cause the same to leak outwardly through said sealing means.

3. A submersible dynamoelectric machine comprising a pair of spaced apart end flange members, an outer shell member mounted on said end flange members and defining a stator and rotor cavity therewith, a stator member mounted in said shell within said cavity, a cooperating rotor member in said cavity and mounted on a shaft, one of said end flange members having an opening formed therein with said shaft extending therethrough, sealing means mounted on said one end flange member adjacent said opening and surrounding said shaft for preventing the entrance of an external liquid to said cavity, another shell member secured to the other of said end flange members, a collapsible bag positioned in said other shell member and having its open end secured to said other end flange member, said other end flange member having an opening formed therein communicating with the interior of said bag and said cavity, said cavity and said bag being adapted to be filled with a fluid, and biasing means including a coil spring in said other shell member engaging the bottom of said bag, said bag extending laterally beyond said biasing means whereby said biasing means tend to turn said bag inside out thereby placing said fluid under continuous pressure and tending to cause the same to leak outwardly through said sealing means.

4. A submersible dynamoelectric machine comprising a pair of spaced apart end flange members, an outer shell member mounted on said end flange members and defining a stator and rotor cavity therewith, a stator member mounted in said shell member within said cavity, a cooperating rotor member in said cavity and mounted on a shaft, one of said end flange members having an opening formed therein with said shaft extending therethrough, sealing means mounted on said one end flange member adjacent said opening and surrounding said shaft for preventing the entrance of an external liquid to said cavity, another shell member having one end secured to the other of said end flange members and in axial alignment therewith, said other shell member having a cover member secured to its other end, a collapsible bag positioned in said other shell member and having its open end secured to said other end flange member, said other end flange member having an opening formed therethrough communicating with the interior of said bag and said cavity, said cavity and said bag being adapted to be filled with a fluid, and biasing means including a coil spring in said other shell member engaging said cover member and the bottom of said bag, said bag extending laterally beyond said biasing means whereby said biasing means tend to turn said bag inside out thereby placing said fluid under continuous pressure and tend to cause the same to leak outwardly through said sealing means.

5. A submersible dynamoelectric machine comprising a first end flange member, a second end flange member spaced from said first end flange member and having a recess formed in its outer face, a third end flange member secured to said second end flange member outer face and having a recess defining a seal cavity with said second end flange member recess, an outer shell member secured to the outer peripheries of said first and second end flange members defining a stator and rotor cavity therewith, a stator member mounted in said shell within said stator and rotor cavity, a cooperating rotor member in said stator and rotor cavity and mounted on a shaft, said first end flange member having a thrust bearing formed therein for seating one end of said shaft, said second and third end flange members having an opening formed therein with the other end of said shaft extending therethrough and through said seal cavity, sealing means mounted in said seal cavity and surrounding said shaft for preventing the entrance of an external liquid to said stator and rotor cavity, another shell member having one end secured to said first end flange member and in axial alignment therewith, said other shell member having a cover member secured to its other end, a collapsible bag formed of resilient material positioned in said other shell member and having its open end secured to said first end flange member, said first end flange member having an opening formed therethrough communicating with the interior of said bag and said stator and rotor cavity, said second end flange member having an opening formed therethrough communicates with said seal cavity and said stator and rotor cavity, said cavity and said bag being adapted to be filled with a fluid, a coil spring in said other shell member having one end engaging said cover member, and a cup-shaped member surrounding the other end of said spring engaging the bottom of said bag, said bag extending laterally beyond said cup-shaped member, said spring tending to turn said bag inside out over said cup-shaped member as a form thereby placing said fluid under continuous pressure and tending to cause the same to leak outwardly through said sealing means.

6. A submersible dynamoelectric machine comprising an outer casing defining a stator and rotor cavity, a stator member mounted in said casing within said cavity, a cooperating rotor member in said cavity and mounted on a shaft, sealing means mounted in said casing and surrounding said shaft at one end of said cavity for preventing the entrance of an external liquid to said cavity, a collapsible bag having its open end secured to said casing and communicating with said cavity, said casing and said bag being adapted to be filled with a fluid, and biasing means engaging the bottom of said bag, said bag extending laterally beyond said biasing means whereby said biasing means tend to turn said bag inside out thereby placing said fluid under continuous pressure and tending to cause the same to leak outwardly through said sealing means.

7. A submersible dynamoelectric machine comprising an outer casing defining a stator and rotor cavity, a stator member mounted in said casing within said cavity, a cooperating rotor member in said cavity and mounted on a shaft, sealing means mounted in said casing and surrounding said shaft at one end of said shaft cavity for preventing the entrance of an external liquid to said cavity, another casing secured to said outer casing, a collapsible bag positioned in said other casing and having its open end secured to said outer casing and communicating with said cavity, said cavity and said bag being adapted to be filled with a fluid, a cup-shaped member having its closed end engaging the closed end of said bag and resilient means in said other casing engaging the bottom of said cup-shaped member and extending therein, said bag extending laterally beyond said cup-shaped member whereby said resilient means tends to turn said bag inside out over said cup-shaped member as a form thereby to place said fluid under continuous pressure and tends to cause the same to leak outwardly through said sealing means.

References Cited in the file of this patent

UNITED STATES PATENTS

| | | |
|---|---|---|
| 2,301,340 | Spengler | Nov. 10, 1942 |
| 2,404,783 | Blom | July 30, 1946 |
| 2,539,048 | Arutunoff | Jan. 23, 1951 |

FOREIGN PATENTS

| | | |
|---|---|---|
| 616,994 | Germany | Aug. 9, 1935 |